United States Patent Office 3,355,434
Patented Nov. 28, 1967

3,355,434
METHOD FOR PREPARING POLYESTER RESINS
John G. Milligan and Harold G. Waddill, Austin, Tex., assignors to Jefferson Chemical Company, Inc., Houston, Tex., a corporation of Delaware
No Drawing. Filed Mar. 2, 1964, Ser. No. 348,804
7 Claims. (Cl. 260—75)

This invention relates to a method for the preparation of improved polyester resins. More particularly, this invention relates to a method for the preparation of olefinically active polyester resins having improved color.

Polyester resins may be prepared by the reaction of organic acid anhydrides with oxirane compounds as described, for example, in U.S. Patent No. 2,779,783 and in copending application Serial No. 336,010, filed Jan. 6, 1964, and entitled, "Method of Preparing Linear Polyesters." The temperatures encountered in these reactions are substantially below those employed in the preparation of polyesters by the reaction of polybasic acids with polyhydric alcohols. In general, the use of maleic anhydride in these low temperature processes results in the formation of unsaturated polyesters that cannot be satisfactorily cross-linked with vinylic cross-linking agents such as alkyl or aromatic hydrocarbons containing vinyl side chain unsaturation (e.g., styrene, alphamethylstyrene, vinylnaphthalene, vinyltoluene, etc.) in the usual manner.

In copending application Ser. No. 336,010, filed Jan. 6, 1964 and entitled "Olefinically Active Polyesters," there is disclosed a method whereby low activity maleic polyesters may be activated by heating at a temperature within the range of about 190° to about 250° C. for a period of time within the range of about one to about five hours. Unsaturated polyester resins treated in this manner exhibit good activity; however, they suffer from the disadvantage of being highly colored.

It has now been surprisingly discovered that unsaturated polyester resins having good activity and good color can be obtained from unsaturated polyester resins prepared using maleic anhydride in a low temperature process by adding a strong acid subsequent to the polyesterification and prior to heating the polyester resin at a temperature within the range of about 190° to about 250° C. for a period of time within the range of about one to about five hours.

The maleic polyester prepared according to the procedure of copending application Ser. No. 336,010 is a typical low-activity unsaturated resin and may be characterized as a polymeric polyester formed by the alternate addition of organic acid anhydride and oxirane groups to an aliphatic dihydric alcohol or dibasic organic acid initiator. Two basic reactions are thus involved in the growth of the polyester chain. One of these is the reaction of a hydroxyl group with an acid anhydride resulting in the formation of an ester linkage and a free carboxyl group. The other reaction is that of a carboxyl group with an oxirane ring resulting in the formation of an ester linkage and a free hydroxyl group.

The acid anhydride component used in the preparation of the polyester comprises 10–100 mol percent maleic anhydride, the balance being an aromatic or aliphatic dibasic acid anhydride which may be saturated or unsaturated. Acid anhydrides which may be used with maleic anhydride include, for example, phthalic anhydride, succinic anhydride, itaconic anhydride, chlorendic anhydride, tetrahydrophthalic anhydride, tetrachlorophthalic anhydride, glutaric anhydride, and the corresponding homologues and analogues thereof.

The oxirane compound employed is a monoepoxide which contains the epoxide grouping in a terminal position. Thus the epoxide will have the following formula:

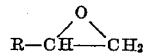

wherein R is hydrogen, a $C_1$–$C_{18}$ alkyl group, an aryl group or a $C_1$–$C_4$ haloalkyl group. For example, ethylene oxide, propylene oxide, 1,2-butylene oxide, styrene oxide, epichlorohydrin, dodecene oxide, etc., may be used alone or in admixture.

The dihydric alcohol to be employed as initiator in the formation of the polyester is preferably a glycol corresponding to an epoxide of the type listed above, but may also be a higher aliphatic dihydric alcohol such as, for example, 1,4-butanediol, 2-butene-1,4-diol, diethylene glycol, dipropylene glycol and polyethylene and polypropylene glycols such as, for example, those having molecular weights of about 400.

If the reaction is initiated by a dibasic acid the acid employed is preferably a dibasic acid corresponding to a dibasic acid anhydride described hereinabove. However, other dibasic acids may also be used. Acceptable acids include, for example, glutaric acid, succinic acid, fumaric acid, the phthalic acids, azelaic acid, itaconic acid and maleic acid.

The polyester is prepared in the presence of a catalyst which substantially selectively promotes the reaction between oxirane groups and carboxyl groups. Preferred catalysts for this reaction are lithium chloride and quaternary ammonium halides. Other quaternary ammonium compounds, tertiary amines, quaternary phosphonium compounds, sulfonium salts and alkali metal hydroxides, halides and carbonates may also be used. Examples of acceptable catalysts include lithium chloride,
sodium carbonate,
potassium hydroxide,
trimethylamine,
triethylamine,
triethylenediamine,
N,N'-dimethylpiperazine,
ammonium chloride,
ammonium bromide,
ammonium fluoride,
ammonium iodide,
tertamethylammonium bromide,
tetraethylammonium bromide,
tetraethylammonium chloride,
tetramethylammonium iodide,
methyltriethylammonium fluoride,
tetraethylammonium iodide,
aniline hydrobromide,
triethylammonium bromide,
phenyltrimethylammonium iodide,
cetylpyridinium bromide,
octadecyltrimethylammonium chloride,
dimethyl-p-toluidine hydrochloride,
pyrrolidine hydrochloride,
tetrabutylammonium bromide,
naphthyltrimethylammonium chloride,
tolyltrimethylammonium bromide,
benzyltrimethylammonium iodide,
benzyltrimethylammonium bicarbonate,
methyltriphenylphosphonium bromide,
triphenylsulfonium chloride,
benzyltrimethylammonium hydroxide,
tetramethylammonium sulfate, etc.

In general, the catalyst will constitute from about 0.05 to about 5% by weight of the reaction mixture.

The polyester is prepared under reaction conditions which will preferably include anhydrous or substantially anhydrous conditions and a reaction temperature preferably within the range of about 80° to about 150° C. The pressure is not critical and autogenous pressures are employed. The reaction time is dependent upon a number of factors but is generally less than about five hours, sufficient to provide a polyester resin having the desired acid number. The heating step to increase the activity is more effective if the resin has an acid number of from about 40 to about 120. The preferred acid number range is from about 40 to about 60.

Normal polyester procedures may be employed in preparing the polyester starting material for the present invention with a proviso that the reaction be preferably conducted under substantially anhydrous conditions and with a further proviso that the initiator be added to the reactor at the beginning of the reaction. Other than this, the relative order of addition of oxirane and organic acid anhydride components is not critical. Thus, after the initiator has been charged to the reaction vessel, the organic acid anhydride and oxirane compound may be added at the beginning of the reaction or in incremental portions as the reaction proceeds, all determined by convenience in accordance with known techniques.

As stated hereinbefore, unsaturated polyester resins obtained by the preceding procedure are not sufficiently active to be satisfactorily cross-linked with vinylic cross-linking agents in the usual manner. The addition of a small amount of a strong acid to the resin followed by heating at 190° to 250° C. will render the resin more active with no adverse effect on color.

Since polyester resins are stable in the presence of acids under the conditions described herein, any inorganic or organic acid may be used in the heating step. Every acid we have studied has resulted in some color improvement. Acids that may be used include, for example, oxalic acid, citric acid, hydrochloric acid, p-toluene sulfonic acid, sulfuric acid and benzoic acid. However, we have found that for maximum improvement phosphoric acid should be used. The superiority of phosphoric acid in this process is totally unexpected. The mechanism involved in the color improvement is unknown and there is no apparent reason for the superiority of phosphoric acid. There appears to be no correlation between acid strength and color improvement obtained.

had a color of Gardner 1. Another 100 g. of the same resin was worked up in the same way except that the phosphoric acid was omitted. This solution had a color of Gardner 4. This color difference carried over into castings made by polymerization using benzoyl peroxide as catalyst at 70° C. The hardness of the two polymers was the same.

*Example II*

Phthalic anhydride (395 g.), propylene glycol (38 g.) and tetramethylammonium bromide (1.57 g) were stirred under nitrogen at 125° C. for 0.5 hour. The mixture was cooled to 90° C. and maleic anhydride (130 g.) was added. Propylene oxide (221 g.) was then added over a period of 20 minutes. The mixture was held an hour longer at 90° C. and then heated one hour at 120° C. To 100 g. of the resin was added 0.072 g. of 85% phosphoric acid and the mixture was heated four hours at 200° C. under nitrogen, then diluted with 50 g. of styrene. The resulting solution had a color of Gardner 2+. Another 100 g. of the resin was treated in the same way except that the phosphoric acid was omitted. The resulting solution had a color of Gardner 3+.

The amount of the acid used may be varied over fairly wide limits. For economic reasons, probably no more than an amount of acid equivalent to the catalyst employed in the polyesterification reaction will be desired. However, an excess of acid such as, for example, a 100% excess may be used without adverse effect. The amount of color improvement obtained decreases slightly as the amount of acid is decreased below an equivalent amount. However, as can be seen from column 3 of Table I, a resin having a very good color was obtained when 0.125 mol of phosphoric acid per mol of lithium chloride was employed. Assuming that the third hydrogen of phosphoric acid does not take part in the reaction because it is extremely weak, this would be one equivalent of acid per four equivalents of catalyst.

After the addition of the acid, the resin should be heated at a temperature of 190° to 250° C. for a period of from about one to about five hours. The long heating periods should be employed with the low temperatures and vice versa. Prolonged heating at high temperatures will adversely affect the resin color.

The effect of various acids and of varying amounts of phosphoric acid was determined using portions of a resin prepared employing lithium chloride as the catalyst. The results are summarized in Table I.

TABLE I.—COLOR IMPROVEMENT OF POLYESTER RESINS

| Acid Used | H₃PO₄ | H₃PO₄ | H₃PO₄ | None | Oxalic | Citric | HCl | p-Toluene Sulfonic |
|---|---|---|---|---|---|---|---|---|
| Mols of acid/mol LiCl | 0.5 | 0.25 | 0.125 | | 0.5 | 0.5 | 1.0 | 1.0 |
| Temperature of treatment, °C | 200 | 200 | 200 | 200 | 200 | 200 | 200 | 200 |
| Length of treatment, hours | 4 | 4 | 4 | 4 | 4 | 4 | 4 | 4 |
| Color, Gardner | <1 | <1 | | ~3 | | 2-3 | 1-2 | <1 |
| Pt-Co (APHA) | 40 | 50 | 75-100 | | 100 | ~250 | 125 | ~75 |

The color improvement to be obtained by the addition of the acid as described herein will be further illustrated by the following examples, which are given by way of illustration and not as limitations on the scope of this invention.

*Example I*

A mixture of phthalic anhydride (395 g.), maleic anhydride (130 g.), propylene glycol (38 g.) and lithium chloride (0.43 g.) was stirred under nitrogen for two hours at 125° C. and then propylene oxide (221 g.) was added slowly over two hours at 125° C. and the mixture was held another 0.5 hour at 125° C. To 100 g. of this resin was added 0.10 g. of 85% phosphoric acid and the mixture was heated under nitrogen for four hours at 200° C. The mixture was then cooled below 150° C. and 0.22 g. of a 5% solution of hydroquinone in dibutyl phthalate and 50 g. of styrene were added. The resulting solution It can be seen from the table that all the acids employed resulted in some improvement in color, although the improvement using citric acid was very minor. There is no apparent correlation between acid strength and color improvement.

Having thus described our invention, what is claimed is:
1. In a method for preparing an olefinically active unsaturated polymeric polyester which comprises reacting
    (A) an initiator selected from the class consisting of dibasic acids and dihydric aliphatic alcohols,
    (B) a terminal oxirane compound having the formula:

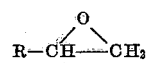

wherein R is hydrogen, a $C_1$–$C_{18}$ alkyl group, an aryl group or a $C_1$–$C_4$ haloalkyl group, and
    (C) a dicarboxylic organic acid anhydride component comprising from about 10 to about 100 mol percent maleic anhydride at a temperature in the range of about 80° to about 150° C. in the presence of a catalyst selected from the group consisting of alkali metal hydroxides, halides and carbonates, tertiary amines, quaternary ammonium hydroxides and salts, quaternary phosphonium salts and sulfonium salts, and thereafter heating said polyester at a temperature within the range of about 190° to about 250° C. for a period of time within the range of about one to about five hours, the improvement which comprises adding an acid in an amount ranging from about 0.25 to about 2 equivalents of acid per equivalent of polyesterification catalyst subsequent to the polyesterification step and prior to the step of heating at 190° to 250° C., said acid being selected from the group consisting of inorganic mineral acids and organic carboxylic and sulfonic acids.

2. A method as in claim 1 wherein the catalyst is a quarternary ammonium halide and the acid is phosphoric acid.

3. A method as in claim 2 wherein the catalyst is lithium chloride.

4. A method as in claim 2 wherein the initiator is propylene glycol, the oxirane compound is propylene oxide and the dicarboxylic organic acid anhydride component consists of maleic anhydride.

5. A method as in claim 4 wherein the catalyst is lithium chloride.

6. A method as in claim 2 wherein the initiator is propylene glycol, the oxirane compound is propylene oxide and the dicarboxylic organic acid anhydride component comprises from about 10 to about 90 mol percent of maleic anhydride, the remainder consisting of phthalic anhydride.

7. A method as in claim 6 wherein the catalyst is lithium chloride.

References Cited

UNITED STATES PATENTS

| | | | |
|---|---|---|---|
| 2,951,060 | 8/1960 | Billica | 260—75 |
| 3,089,863 | 5/1963 | Hicks et al. | 260—75 |
| 3,213,067 | 10/1965 | Pohl et al. | 260—78.4 |

FOREIGN PATENTS 802,921  10/1958  Great Britain.

WILLIAM H. SHORT, *Primary Examiner.*

SAMUEL H. BLECH, *Examiner.*

R. LYON, *Assistant Examiner.*